R. P. BIBB.
RESILIENT WHEEL.
APPLICATION FILED OCT. 23, 1919.
1,395,085.
Patented Oct. 25, 1921.
2 SHEETS—SHEET 1.
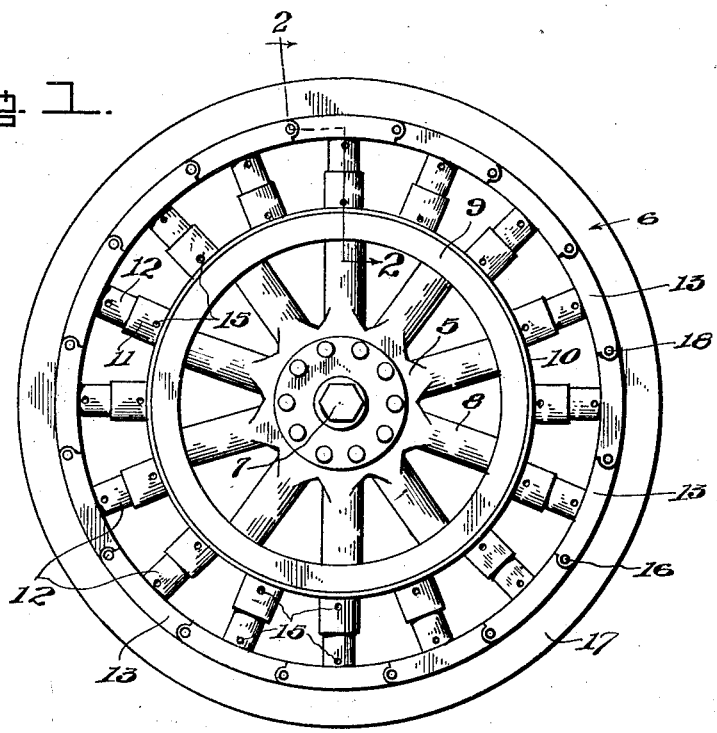
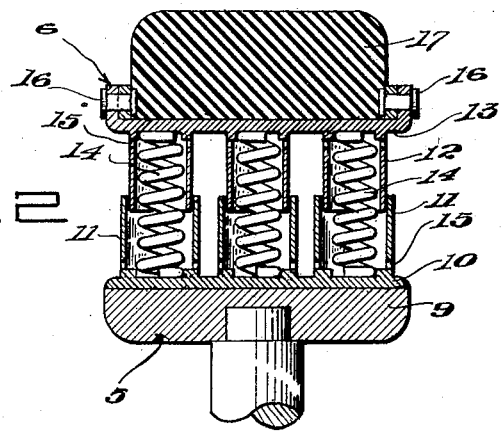
Robert P. Bibb.
Inventor

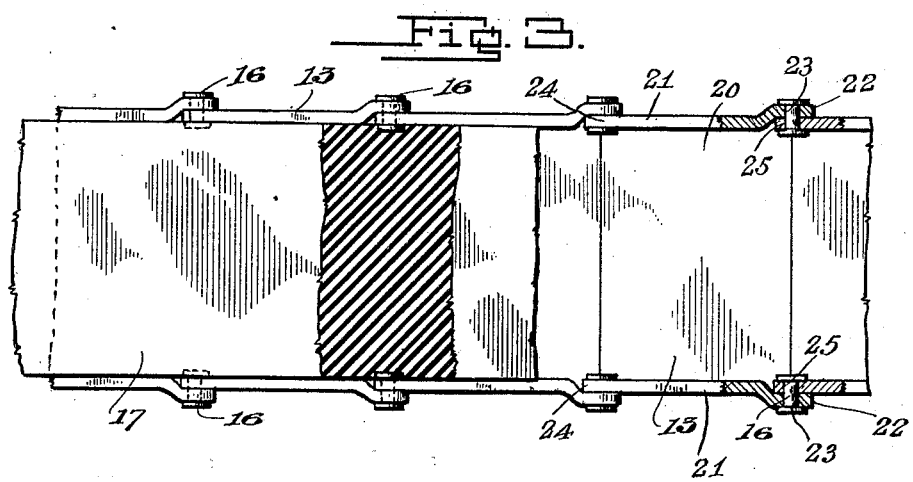
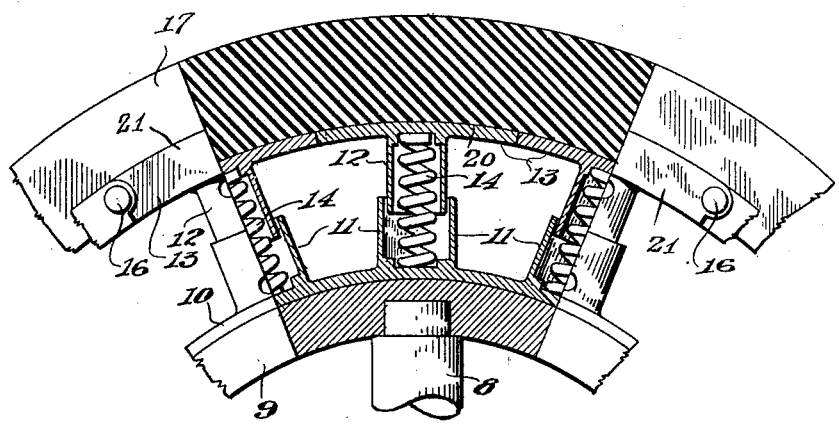

UNITED STATES PATENT OFFICE.

ROBERT P. BIBB, OF VAN BUREN, ARKANSAS.

RESILIENT WHEEL.

1,395,085.   Specification of Letters Patent.   Patented Oct. 25, 1921.

Application filed October 23, 1919. Serial No. 332,671.

*To all whom it may concern:*

Be it known that I, ROBERT PAUL BIBB, a citizen of the United States, residing at Van Buren, in the county of Crawford and State of Arkansas, have invented certain new and useful Improvements in Resilient Wheels, of which the following is a specification.

This invention relates to resilient wheels, and an object of the invention is to provide a resilient wheel structure, designed to absorb shock incident to the travel of the wheel over a road surface, and which resilient wheel structure is designed principally to eliminate the inconveniences contingent with the use of pneumatic tires and also to reduce the expense of upkeep of the vehicle upon which the wheel is used, by decreasing the tire upkeep cost.

More specially the invention comprehends the provision of a resilient wheel structure comprising a hub structure having a plurality of radially extending open ended cylindrical portions carried by the periphery of the rim thereon, which forms an inner rim for the wheel structure, and which telescopically receives therein the ends of analogous cylindrical members which are carried by the outer rim structure of the wheel, the outer rim structure being composed of a plurality of pivotally connected sections, each of which carries a plurality of laterally alining cylindrical members, and which outer rim structure also receives therein a cushion tire, or a tire of any suitable construction.

Other objects of the invention will appear in the following detailed description taken in connection with the accompanying drawing, forming a part of this specification, and in which drawing:

Figure 1 is a side elevation of the improved resilient wheel.

Fig. 2 is a section through the resilient wheel taken on the line 2—2 of Fig. 1.

Fig. 3 is a fragmentary top plan of the improved resilient wheel illustrating parts thereof in section, and Fig. 4 is a fragmentary enlarged side elevation of a part of the resilient wheel illustrating parts thereof in section.

Referring more particularly to the drawings, wherein like characters indicate like and corresponding parts throughout the several views, the improved resilient wheel comprises a hub structure 5, and a rim structure 6. The hub structure 5 comprises the usual hub 7 having a plurality of radiating spokes 8 rigidly attached thereto to the outer ends of which spokes is attached an inner rim 9. A metal band 10 is mounted about the periphery of the inner rim 9 and this band or rim 10 has a plurality of substantially cylindrical extensions 11 formed thereon, and arranged in laterally extending sets, spaced circumferentially about the periphery of the rim 10 as clearly shown in Figs. 2 and 4 of the drawings.

These cylindrical extensions 11 telescopically receive the companion cups or extensions 12 which are arranged in lateral sets as clearly shown in Fig. 2 of the drawings, and are carried by the outer rim structure 6, one set being carried by each of the links 13, of this outer rim structure. The cylindrical sleeves or extensions 11 and 12 are hollow and expansion spiral springs 14 are mounted therein to permit resilient movement of the outer rim structure 6 with respect to the inner rim structure 9 for the purpose of absorbing shock incident to the bringing of pressure upon any portion of the wheel during the travel thereof. The sleeve extensions 11 and 12 are provided with vent openings 15 adapted to permit the escape of air therefrom during operation of the wheel.

The links 13, are preferably each of a single casting or stamping of metal and includes the arcuate seating plate 20 on which the longitudinal edges 21 are upturned for substantially the entire length of the plate, and in fact providing projecting edges upon each end thereof. Similar ends 22 of the edges 21 are outturned from the longitudinal run of the edges and are provided with alining apertures 23 therein. The opposite ends 24 of the edges 21 lie in the longitudinal run of said edges, and are provided with suitable alining apertures 25 therein. As hereinbefore mentioned the sleeves 12 are carried by each of the links 13 and it is preferred that they extend in opposite directions from the flanges or edges, and be disposed centrally upon the plate 20. In assembling adjacent links 13, the ends 24 upon edges 21 are inserted intermediate the ends 22 which are outturned upon the edges 21 of an adjacent link 20, and a pivoting element 16 is inserted through the alining apertures 23 and 25 of the ends 22 and 24 respectively, thus connecting adjacent links 20. This method of connecting the links 13 is followed throughout the rim, and thus providing a structure having the edges or flanges 21 in substantial alinement to provide a recess therebetween for the reception of a tire 17, which tire may be of any approved type.

The pivotal connection of the links or sections 13 of the outer rim structure will permit telescopic movement of the sleeve extensions 11 and 12 relative to each other during their various positions, during the rotation of the wheel structure, without binding, and permit the said portion of the wheel structure which is forced inwardly or displaced by pressure to immediately spring back to its normal position after release of the pressure.

Changes in details may be made without departing from the spirit of this invention, but;

I claim:

1. In a resilient wheel, the combination, of a hub structure, spokes, an inner rim rigidly connected to said spokes, an annular band mounted about the periphery of said inner rim, a plurality of radially extending substantially cylindrical sleeve extensions integrally carried by said annular band, a flexible outer rim structure, comprising a plurality of pivotally connected links, each of said links integrally provided with a plurality of cylindrical sleeve extensions centrally thereof adapted to co-act within said sleeve extensions of said annular band, expansion coil springs maintained within said sleeve extensions and adapted to yieldably maintain said outer and inner rim structures in spaced relation, said links of the outer rim having their longitudinal edges bent outwardly, and pivotally connected to provide a recess circumferentially about said outer rim, and a tire disposed within said recess.

2. As an article of manufacture, a rim link provided with an arcuate seating plate having longitudinal edge portions thereof bent outwardly to provide a recess therebetween, similar ends of said edge portions being outturned from the longitudinal run thereof, and having alining apertures therethrough, the opposite ends of said longitudinal edges having alining apertures therein; and sleeve extensions cast integral upon a side of said seating plate and extending opposite in direction to said longitudinal edges.

ROBERT P. BIBB.